Jan. 9, 1940. H. O. HEM 2,186,831
TESTING DEVICE
Filed Oct. 19, 1938 3 Sheets-Sheet 1
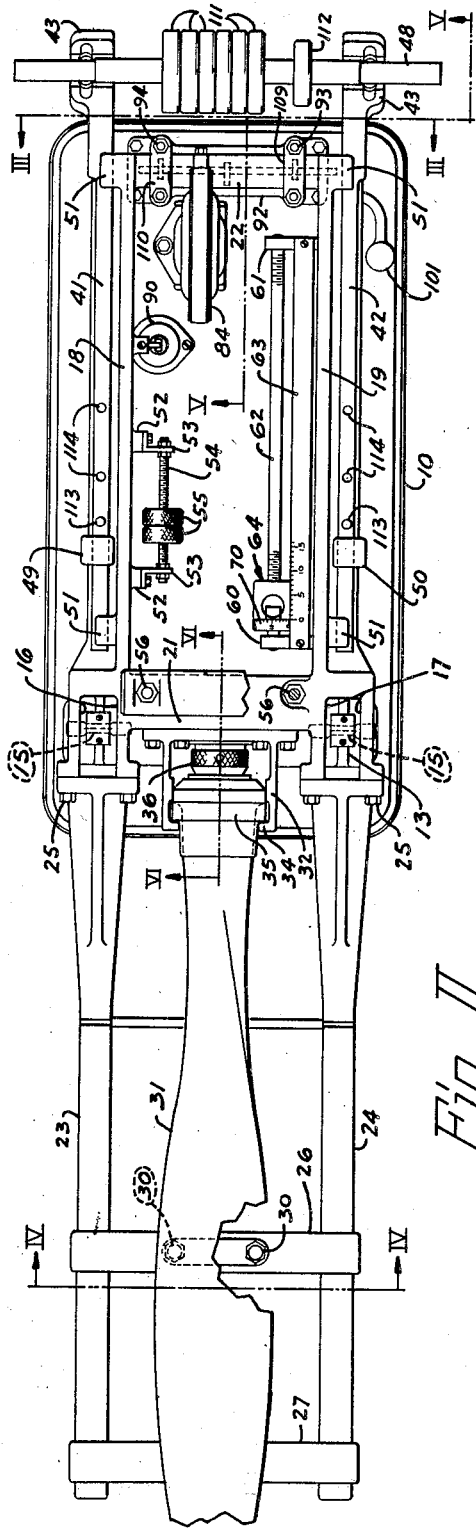
Fig. II
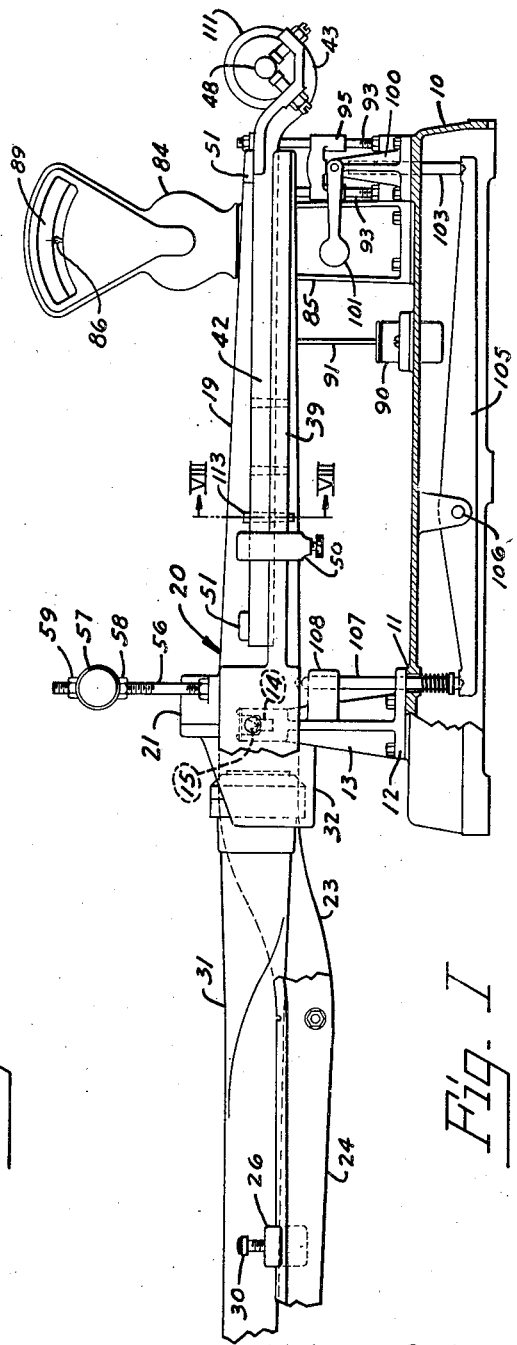
Fig. I
Halvor O. Hem
INVENTOR
BY Marshall & Marshall
ATTORNEYS

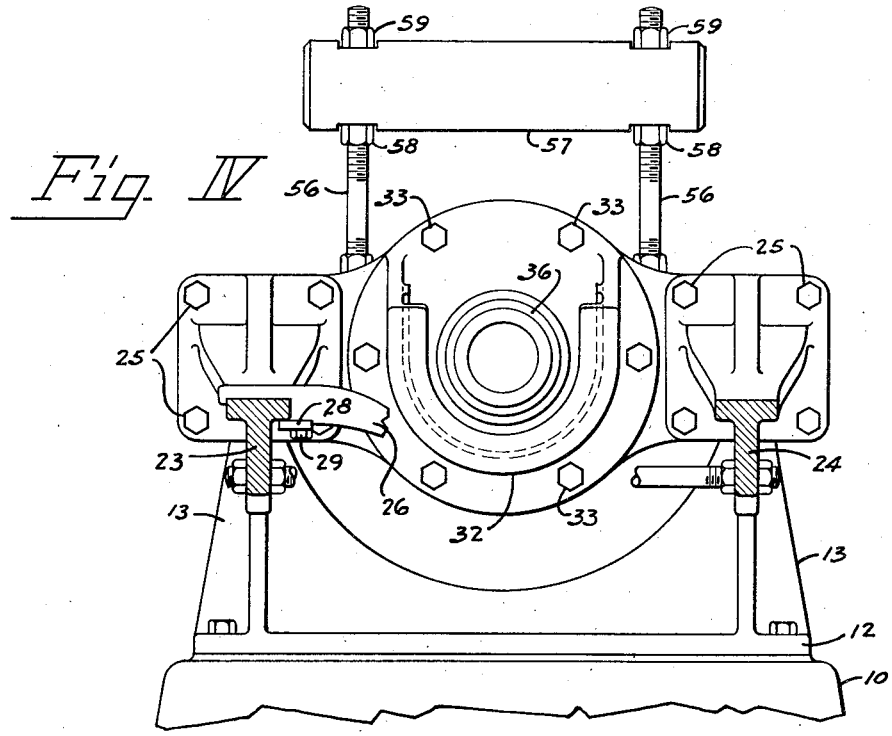
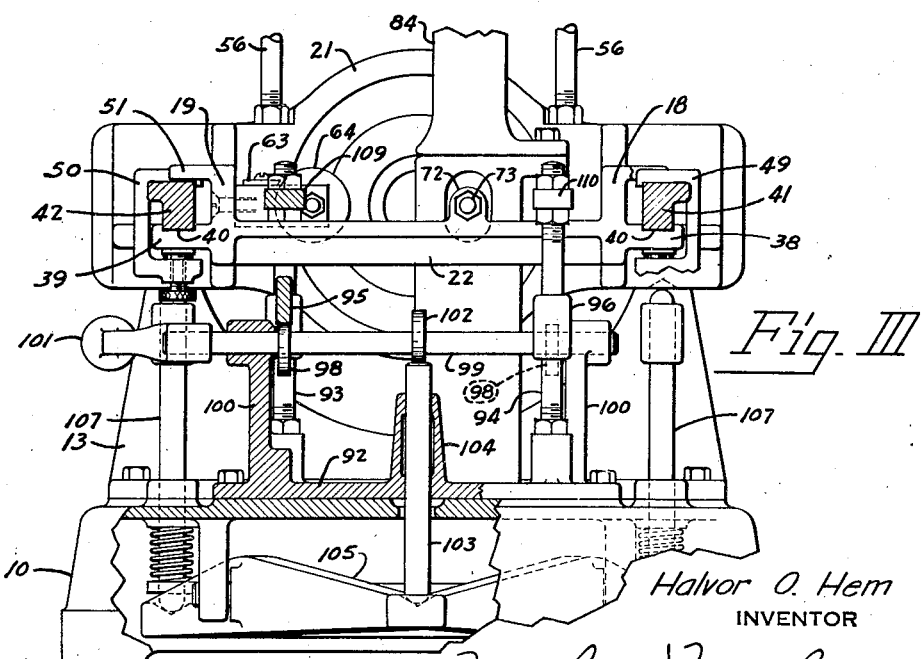

Jan. 9, 1940.　　　　　H. O. HEM　　　　　2,186,831
TESTING DEVICE
Filed Oct. 19, 1938　　　　3 Sheets-Sheet 3
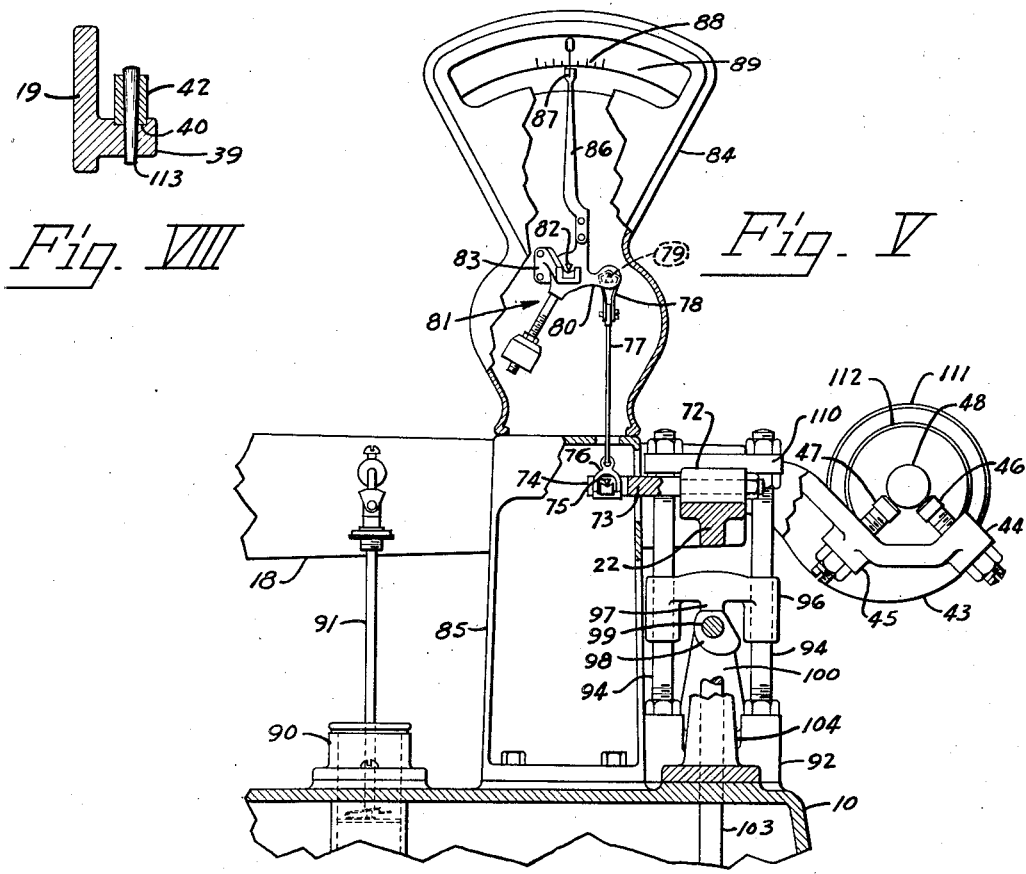
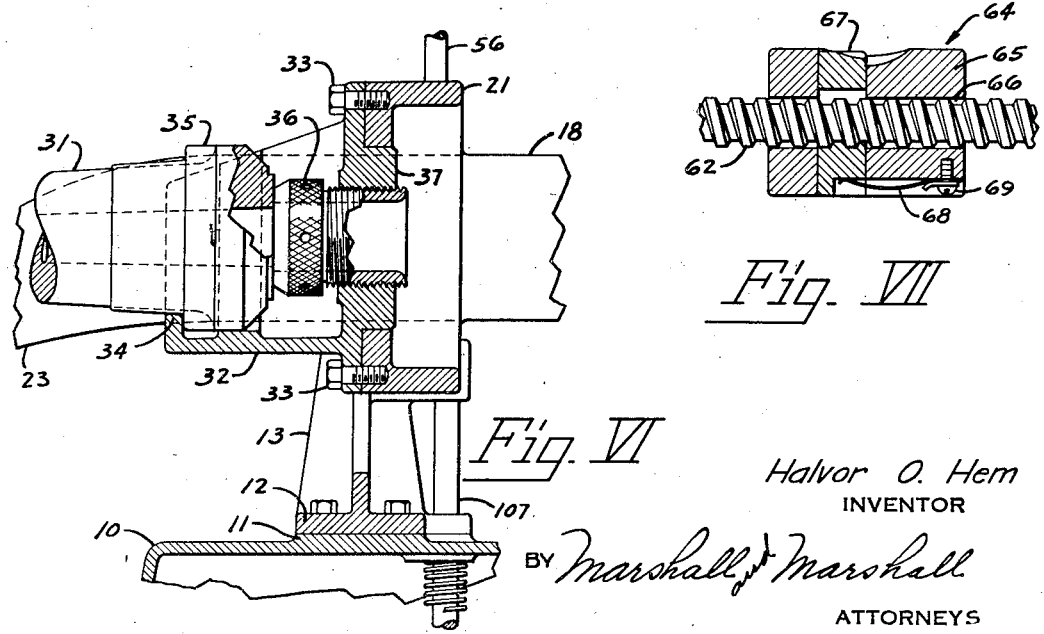
Halvor O. Hem
INVENTOR
BY Marshall & Marshall
ATTORNEYS Patented Jan. 9, 1940

2,186,831

UNITED STATES PATENT OFFICE 2,186,831

TESTING DEVICE

Halvor O. Hem, Toledo, Ohio, assignor to Toledo Scale Manufacturing Company, Toledo, Ohio, a corporation of New Jersey Application October 19, 1938, Serial No. 235,832

14 Claims. (Cl. 73—51)

This invention relates generally to testing devices, and more particularly to devices for statically balancing and reproducing blades for propellers such as used on aircraft or other devices employing air screws. It has heretofore been customary to reproduce propeller blades in conformity with a master. Such master blades, however, must be permanently retained for reference purposes and furthermore a master blade must be supplied to each source of supply of that blade. The wastefulness of this method in both time and money is obvious.

The object of this invention is a device for quantitatively determining a moment of a propeller blade.

Another object is the provision of an improved device whereby propeller blades may be given the same definite quantitative characteristics without comparison with a master blade.

Another object is the provision of an improved device having means for supporting propeller blades substantially in the same manner they are supported in the craft or device in which they are used.

Still another object is the provision of improved means for determining a static moment of a propeller blade in definite units, such as inch-pounds.

Another object is the provision of a device for balancing a propeller blade in which the position of the counterbalancing weights varies directly as the center of mass of the propeller varies due to variations in temperature.

Still a further object is the provision of means whereby the position of the counterbalancing weights may be varied proportionally to the variation of the center of mass of a propeller blade due to variations in temperature; and, Another object is the provision of means for automatically indicating the variation of a moment of the propeller blade in a definite quantity.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of a device embodying the invention.

Fig. II is a plan view thereof.

Fig. III is an enlarged end elevational view in section substantially along the line III—III of Figure II.

Fig. IV is an enlarged end elevational view of the opposite end, sectioned substantially along the line IV—IV of Fig. II.

Fig. V is an enlarged fragmentary sectional view substantially along the line V—V of Fig. II and showing particularly the indicating and locking means.

Fig. VI is an enlarged fragmentary sectional view substantially along the line VI—VI of Fig. II and showing the propeller blade arbor in greater detail.

Fig. VII is a fragmentary sectional view through a micrometer counterbalancing weight; and, Fig. VIII is a section substantially along the line VIII—VIII of Fig. I showing in detail the method of securing a supplementary arm to the arm of the beam.

Referring to the drawings in detail:

The device is provided with a rigid base or frame 10 having a machined pad 11 adjacent one of its ends, to which is bolted a fulcrum stand 12. This fulcrum stand 12 comprises two spaced upwardly extending arms 13 having hardened V bearings 14 in their upper ends which form fulcrums for knife edge pivots 15 extending between furcations 16 and 17 in arms 18 and 19 of a beam 20. These arms 18 and 19, which are parallelly spaced, are connected by transversely extending integral members 21 and 22 forming a substantially rectangular frame. The transverse member 21 is substantially circular in shape and is so located that one of the faces, after being machined, as by milling, lies in a vertical plane passing through the knife edges of the pivots 15. The vertical ends of the furcated portions of the arms 18 and 19 are machined and a pair of longitudinally extending arms 23 and 24 are fastened thereto by means of bolts 25. These arms have a substantially T-shaped cross section. The upper horizontal flanges are machined and form supports for suitably machined seats of adjustable cross arms 26 and 27 which are adapted to be clamped to these flanges by means of clips 28 and bolts 29 (Fig. IV). The cross arm 26 is provided with two adjustable stops 30, the heads of these stops form a rest for a propeller 31 when it is in the exact horizontal position, the shank end resting in receiver 32 which is fastened by means of bolts 33 to the vertical machined face of the cross member 21 of the beam 20. Since the propeller blades 31 must be secured in the device under conditions simulating its actual use these receivers are interchangeable for different propellers and a receiver 32 must be provided for every different type of propeller blade processed in this device. Since the propeller blades have considerable weight and are awkward to handle it is necessary that the receiver be adapted so that the shank of the propeller may be inserted in a manner so as not to cause any reaction on the pivot of the beam.

According to the present invention the receiver is provided with an open top and one open side and its bottom is so shaped that it snugly engages a substantial portion of the propeller shank. An inwardly projecting flange 34 is adapted to engage a shoulder on the propeller shank and a screw member 36 having a flat head threaded into the closed side of the receiver is adapted to clamp the shoulder of the shank against the inwardly turned flange. To obtain a greater length of thread, the side of the receiver through which the clamp member is threaded is provided with a circular boss 37 which penetrates the vertical wall of the transverse member 21.

Propellers for airplane use are often equipped with means for varying the pitch of the propeller when the plane is in flight. Such propellers usually have a roller thrust bearing 35 which is permanently mounted upon the shank before it is upset when the blade is forged. When such a propeller is processed in this device the thrust bearing 35 is positioned between the inwardly turned flange 34 of the receiver and the shoulder on the shank. With this construction it is obvious that when the propeller is held in a horizontal position it may be lowered vertically into the receiver without reaction on the pivots of the beam.

It is very necessary that propeller blades be very accurately balanced to obviate the setting up of vibrations, flutter, etc., when revolving at a high speed. Since propeller blades are made from various materials which have different coefficients of expansion it is necessary to compensate for the shift of the center of gravity of the blade due to expansion when the device is used interchangeably for testing blades of different materials. When the device is employed only for testing propeller blades of one material, such as aluminum alloy, corrective means are unnecessary when the arms of the levers are made from the same material as the counterbalance weight support then varies directly with the variation of the center of gravity of the blade.

In the present invention the thermoresponsive compensating means comprise the following:

The parallel arms 18 and 19 of the beam 20 have outwardly extending horizontal flanges 38 and 39 respectively, in which shallow rectangular grooves 40 are machined to form ways for extending rectangular arms 41 and 42 of a counterbalance weight support 43. This support comprises a substantially V-shaped end, reinforced by flanges provided with bosses 44 and 45 through which bolt-like members 46 and 47 are threaded in such a manner that heads thereon form a substantially V-shaped seat for a counterpoise shaft 48. It is obvious that by properly adjusting these angularly extending screws that a seat may be formed for shafts of various diameters so that the longitudinal axis of the shaft is bisected by a plane passing through the turning axis of the beam 20. These arms 41 and 42 are locked to the flanges 38 and 39 by means of clamps 49 and 50. The clamps are adjustable along the arms 18 and 19 for a reason which will later become clear. Stop plates 51 secured to the upper surface of the vertical flange of the arms 18 and 19 are also provided to prevent tipping of the arms 41 and 42 when the clamps 49 and 50 are released.

To aid in obtaining a static balance of the beam 20, with all of its component parts assembled thereto, the arm 18 is provided with inwardly extending bosses 52 to which brackets 53 are bolted, supporting a screw 54 between them. This screw adjustably supports balance weights 55. Threaded rods 56 studded into the beam 20 adjacent the fulcrum pivot 15 in an upwardly direction support a balance weight 57 locked thereon by means of nuts 58 and 59. This weight is provided to accurately balance the beam 20 and counteract any tendency towards pendularity.

Projecting inwardly from the arm 19 are brackets 60 and 61 supporting a horizontally extending micrometer screw 62 and a graduated plate 63. The graduations on this plate represent inch-pounds counterbalanced by a micrometer poise 64. This micrometer poise comprises a body portion 65 having an axial bore 66 whose diameter is such that this body may slide freely over the threads of the screw 62. The body 65 has a rectangular hole broached therethrough in which a block 67 is seated. This block is drilled and tapped to match the thread on the screw 62 and the upper half of the thread is then removed by enlarging that portion of the hole so that when seated in the broached hole in the body 65, and under the pressure of a spring 68 clamped in a recess in the body 65 by screw 69, the remaining threads in the block 67 will engage the threads of the screw 62 and move the body 65 along the screw when the body 65 is turned but when the member 67 is pressed downwardly against the spring 68 the half thread in the block 67 disengages from the thread on the screw 62 and the micrometer poise 64 may be slid freely until the pressure is removed from the block 67 and its threads again engage the threads of the screw. This "split nut" mechanism is well known in the art and requires no further explanation. The poise 64 is so calibrated with respect to the threads on the screw 62 that one turn represents one inch-pound and thus the graduations on the plate 63 indicate the amount offset in inch-pounds. The body 65 of the poise 64 is also provided with a series 70 of peripheral graduations. Each of these graduations, as can readily be seen, represents a fraction of an inch-pound in the well known manner.

The arms 18 and 19 at their outer end are connected by a transversely extending brace 22. This brace is provided with a projection 72 extending parallel to the longitudinal axis of the beam and drilled for the reception of a round shank 73 of a "nose iron" 74. The end of this nose iron is bifurcated and the bifurcation is spanned by a knife edge pivot 75 which engages a suitable bearing in a stirrup 76 connected by a short rod 77 to a suitable stirrup 78 engaging a knife edge 79 in an arm 80 of a pendulum 81. This pendulum, by means of a pivot 82, is fulcrumed upon a bracket 83 in the interior of a scale housing 84 mounted upon a stand 85 which is fastened to the base 10. Secured to the pendulum 81 and extending in an upwardly direction is an indicator 86 provided with an index 87 which cooperates with indicia 88 upon a chart 89 fixed within the housing 84 to indicate the condition of balance of the beam. A dashpot 90, fixed in the base 10, and whose plunger rod 91 is secured to the arm 18, is provided for damping the oscillations of the beam in the usual manner.

Since in establishing the desired moments of the propeller blade certain mechanical operations must be performed on the blade itself it is necessary that the beam 20 in this device be adapted to raise its fulcrum pivot from its bearing and to be locked in this raised position. To accomplish this, the base 10 beneath the free end of the beam 20 is provided with a machined pad upon which a bracket 92 is bolted, and studded into each end of this bracket is a pair of upwardly extending parallel rods 93 and 94 which are spaced so as to straddle the brace 22 extending transversely between the arms 18 and 19 of the beam 20. Clamping members 95 and 96 are slidably mounted upon these rods 93 and 94 respectively by means of parallelly spaced reamed holes. These clamping members on their lower side have a flat boss 97 which in unlocked position rest upon a flat portion of a cam 98 keyed to a horizontally extending shaft 99 rotatably mounted in brackets 100 extending upwardly from the bracket 92. The forwardly extending end of the shaft 99 is provided with a crank lever 101 by means of which the shaft may be turned. Turning the handle 101 in a clockwise direction from the position shown in Fig. II the cam 98 raises the clamping members 95 and 96 properly into engagement with the lower edge of the brace 22 of the beam 20. By means of another cam 102 (Fig. III) keyed to the shaft 99 centrally between the cams 98 a push rod 103 vertically positioned in a bore of a boss 104 on the bracket 92, presses downwardly against one end of a lever 105 fulcrumed upon a stationary shaft 106 in the interior of the base 10. The opposite end of this lever engages the bottom of thrust rods 107 which are slidably mounted in bores in the bottom plate of the fulcrum stand 12 and in brackets 108 extending from the arms 13 of the fulcrum stand. The rounded upper ends of the thrust rods 107 engage in machined conical depressions in the underside of the beam 20. Further rotation of the cams 98 and the cam 102 causes the beam to be raised upwardly through the means just described until the upper surface of the transverse brace 22 engages the underside of plates 109 and 110 which are suitably locked on the upper ends of the rods 93 and 94. This upward movement of the beam 20 disengages the fulcrum pivot 15 of the beam 20 from its bearing in the upper ends of the arms 13 of the fulcrum stand 12 and certain mechanical operations may be performed on the blade without injury to the device. Since only a small upward movement of the beam 20 is required the connections between this beam and the arm 80 of the pendulum 81 are not disturbed, the only result being that the normally raised pendulum moves downwardly when the "pull" of the pivot 75 on its stirrup diminishes.

In conditioning the device for operation the proper receiver 32 for the type of propeller to be balanced is attached to the cross member 21 by means of the bolts 33 and the cross arm 26 is then positioned so that the stops 30 will be in position to engage the surface of the blade at a point somewhat beyond its center of gravity. The static balance of the beam is then established by moving the cross arm 27 along the arms 23 and 24 and the counterweights 55 on the screw 54 until the index 87 of the indicator 86 registers with the zero indicium on the chart 89. It is understood that in this step the poise 64 is in its zero position. The propeller blade 31 is then carefully placed in the adapter in proper position and the thrust bearing 35 is positioned in contact with the inwardly turned flange 34 and the blade is firmly locked in this adapter by turning the head of the screw member 36 tightly against the butt end of the blade. The propeller is now held in the receiver and the stops 30 in the cross arm 26 are adjusted until their heads engage the face of the blade. The beam 20 which, during this operation, was in its locked position out of engagement with its fulcrum bearing, is now carefully lowered by turning the crank handle 101 in anticlockwise direction and sufficient disk weights 111 are placed on the counterpoise shaft 48 until it is evident that the weight of the propeller is nearly counterbalanced. These weights 111 are calibrated in inch-pounds or if desired in kilogram meter units and the shaft 48, to which a collar 112 is attached, is also calibrated to these units. The exact moment is then established by pressing down the block 67 releasing the poise 64 from the threads and moving this along the micrometer screw 62 until the index 87 approaches the zero indicium on the chart 89. Then by permitting the spring 68 to push the teeth in the block 67 to engage the threads of the screw 62 and by carefully turning this weight until the index of the indicator points directly to the zero indicium the final weight increment is obtained. The static moment of the blade is now established quantitatively by adding the value of the weights 111 and the value of the indication of the micrometer poise 64.

In the embodiment shown it is assumed that the shaft 48 and the collar 112 are adjusted to weigh 5 pounds and each of the weights 111 is adjusted to the same weight. It is further assumed that the distance between the knife edge of the fulcrum pivot 15 and the longitudinal axis of the shaft 48 is 40 inches, when multiplying this distance by the values of the weights of the shaft 48 and the six weights 111 1400 inch-pounds are obtained.

When moving the poise 64 along the beam 63 until the index 87 of the indicator 86 registers with the zero indicium on the chart 89 it is found that the base line of the series of indicia 70, which is the index of the poise, is approximately in registration with the eleventh graduation on the plate 63 and that the eighth graduation in the series of indicia 70 on the body 65 is directly underneath the edge of the plate 63 which constitutes the index of the fractional indication. The poise thus indicates that it is counterbalancing 11.8 inch-pounds. This amount is now added to the 1400 inch-pounds, counterbalanced by the members 48 and 111, giving a static moment of 1411.8 inch-pounds. The blade being numbered it is a simple matter to record this quantity, and when required to replace this blade it is only necessary to condition a similar blade so that its static moment becomes 1411.8 inch-pounds.

It will readily be seen that very slight variations in the length of any of the power arms will result in variations of the static moment greater than can be tolerated in practice, and since all materials have a different coefficient of expansion due to temperature this factor must be taken into consideration.

When the beam 20 of the device is made from one material and the blade, whose static moment is to be adjusted, from another; means must be provided so that the lever arms, i. e., the distance from the center of gravity of the blade to the knife edge of the pivot 15 and the distance between this knife edge and the axis of the counterpoise weight shaft 48, expand or contract equally with changes in temperature.

According to the present invention this is accomplished by making the beam 20 from a material having a relatively low expansion coefficient and by making the arms 41 and 42, carrying the weight supports 43, from a material having a high coefficient of expansion or vice versa. These arms 41 and 42 which are freely seated in grooves in the flanges 38 and 39 are then fixedly positioned in these grooves by a tapered pin 113 which snugly seats in one of a series of accurately positioned aligned taper reamed holes 114 in the aforesaid arms and flanges (Fig. VIII).

The position of these holes 114 is determined at the time of manufacture of the device so that the combined expansion of the length of the beam 20, from knife edge 15 to the pin 113 and that of the arm 41 or 42 from the pin 113 to the axis of the counterpoise shaft 48 is equal to the expansion of the material from which the propeller is made.

The members 49 and 50 being clamped to these arms, very closely adjacent the pin 113 and between it and the fulcrum pivot 15 of the beam 20 it is obvious that the ends of the arms 41 and 42 may expand freely. Any number of aligned holes may be provided for different propeller materials.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, a beam, aligned pivots in said beam forming a rocking axis, a receiver secured to said axis and adapted to hold the shank of a blade for a rotatable propeller on one side of said axis, means secured to said beam on the other side of said axis for the reception of a counterpoise, said receiver being adapted to receive such shank of said blade when held horizontal and lowered vertically into engagement with said receiver, said receiver being adapted to hold said blade so that the rocking axis of said beam has substantially the same relation to said blade as said blade has to the axis of rotation of such rotating propeller, and means movable in the longitudinal direction of said propeller blade for clamping such shank of said blade in said receiver.

2. In a device of the class described, in combination, a frame, a beam, pivots in said beam for rockably supporting said beam upon said frame, means for supporting a counterweight on said beam on one side of said pivots, means secured to said beam in coincidence with said pivots for supporting a propeller blade on the other side of said pivots, said receiving means comprising a bracket adapted to engage a substantial portion of the contour of the shank of said propeller blade, a flange on said bracket, and means for forcing a portion of such shank of said propeller into clamping engagement with said flange.

3. In a device of the class described, in combination, a frame, a beam pivoted to rock about an axis upon said frame, means for supporting a counterweight on said beam on one side of said rocking axis, a receiver extending horizontally on the opposite side of said rocking axis for supporting the shank of a propeller blade, said receiver comprising a body having an open top and an open end, a flange adjacent said open end, a screw extending through the opposite side of said body and adapted to engage the end of said shank of said propeller to force it into clamping engagement with said flange when said propeller is seated in said receiver.

4. In a device of the class described, in combination, a frame, a beam pivoted to rock about an axis upon said frame, means for supporting a counterweight on said beam on one side of said rocking axis, a receiver extending horizontally on the opposite side of said rocking axis for supporting the shank of a propeller blade, said receiver comprising a body having an open top and an open end, a flange adjacent said open end, a screw extending through the opposite side of said body and adapted to engage the end of the shank of said propeller to force it into clamping engagement with said flange when said propeller is seated in said receiver and adjustable means on said beam for supporting said propeller blade at a point between its shank and its tip.

5. In a device of the class described, in combination, a frame, a beam, said beam comprising a pair of longitudinally extending parallel arms, aligned pivots extending from said arms and forming an axis about which said beam may rock upon said frame, a transverse member connecting said parallel arms, a receiver having one open end and an open top secured to said transverse member to support the shank of a propeller blade so that a portion of said shank lies within said receiver and another portion of said propeller shank extends through said open end and screw means for locking said propeller in said receiver and adjustable means forming a V for supporting a shaft of a counterweight on the opposite side of said axis.

6. In a device of the class described, in combination, a frame, a beam, pivots in said beam for rockably supporting said beam upon said frame, adjustable means for supporting counterweights in said beam on one side of said pivots, means secured to said beam in coincidence with said pivots for supporting a propeller blade on the opposite side of said pivots, said receiving means being adapted to receive the shank of said propeller blade when held horizontal and lowered vertically into engagement with said receiver, means movable into engagement with such shank of said propeller blade for clamping said blade in said receiver and an independently mounted pendulated indicator cooperating with said beam for indicating when said counterweight balances said blade.

7. In a device of the class described, in combination, a frame, a beam, said beam comprising cross members and a pair of longitudinally extending parallel arms made of material having a definite coefficient of expansion, aligned pivots extending from said arms and forming an axis about which said beam may rock upon said frame, means secured to said beam for supporting a propeller blade on one side of said pivots, supplementary arms made of a material having a different definite coefficient of expansion supported upon said beam arms extending on the opposite side of said pivots and having means for supporting weights for counterpoising said propeller blade, each of said supplementary arms being fixedly secured to one end of said beam arms with a single pin whereby said supplementary arms and said beam arms are free to independently expand or contract with temperature changes.

8. In a device of the class described, in combination, a frame, a beam, said beam comprising cross members and a pair of longitudinally extending parallel arms made of material having a definite coefficient of expansion, aligned pivots extending from said arms and forming an axis about which said beam may rock upon said frame, means secured to said beam for supporting a propeller blade on one side of said pivots, supplementary arms made of a material having a different definite coefficient of expansion supported upon said beam arms extending on the opposite side of said pivots and having means for supporting weights for counterpoising said propeller blade, each of said supplementary arms being fixedly secured to one end of said beam arms with a single pin whereby said supplementary arms and said beam arms are free to independently expand or contract with temperature changes and each of said supplementary arms and said beam arms having a plurality of predeterminedly spaced aligned holes for the reception of such pin whereby the amount of the expansion and contraction of said arms is predetermined.

9. In a device of the class described, in combination, a frame, a beam, pivots in said beam for rockably mounting said beam upon said frame, means on said beam for supporting a propeller blade in horizontal extending position so that its mass extends to one side of said pivots, beam arms extending on the opposite side of said pivots, said beam arms having a definite coefficient of expansion, flanges on said arms for supporting supplementary arms having a different definite coefficient of expansion, means for counterpoising said propeller blade on said supplementary arms, a plurality of predeterminedly spaced aligned holes in said beam arms and said supplementary arms and a pin for insertion in selected aligned holes in said supplementary arms and beam arms whereby the contraction or expansion, due to changes in temperature, of said beam arms and said supplementary arms is made equal to the contraction and expansion of said propeller blade and an independently mounted pendulated indicator operatively connected to said beam arms for indicating the condition of balance.

10. In a device of the class described, in combination, a frame, a beam, pivots in said beam for rockably mounting said beam upon said frame, means on said beam for supporting a propeller blade in horizontal extending position so that its mass extends to one side of said pivots, beam arms extending on the opposite side of said pivots, said beam arms having a definite coefficient of expansion, flanges on said arms for supporting supplementary arms having a different definite coefficient of expansion, means for counterpoising said propeller blade on said supplementary arms, a plurality of predeterminedly spaced aligned holes in said beam arms and said supplementary arms and a pin for insertion in selected aligned holes in said supplementary arm and beam arm whereby the contraction or expansion of said beam arms and said supplementary arms due to changes in temperature is made equal to the contraction and expansion of said propeller blade, an independently mounted pendulated indicator operatively connected to said beam arms for indicating the condition of balance and a secondary load counterbalancing means comprising a micrometer poise secured to said beam arms.

11. In a propeller balancing device of the class described, in combination, a beam having a rocking axis, a receiver for supporting one end of a propeller blade extending on one side of said rocking axis, lever arms extending on the opposite side of said rocking axis, said lever arms comprising two members each having a different definite coefficient of expansion and means for connecting said arm members at various distances from said rocking axis whereby the amount of expansion or contraction may be predetermined.

12. In a device of the class described, in combination, a beam having a rocking axis, said beam comprising a plurality of longitudinally extending arms and a plurality of transversely extending arms connecting said longitudinally extending arms, a frame, upwardly extending arms in said frame for supporting the rocking axis of said beam, means on said beam for supporting a propeller blade for the determination of a static moment, said means comprising a receiver adapted to receive said propeller blade when said blade is held horizontal and lowered vertically, screw means for clamping said propeller blade in said receiver and locking means engaging one of said transverse beam members adjacent the end of said beam and means actuated by said locking means for bodily lifting said beam from its support, said means including vertically positioned spring pressed push rods.

13. In a device of the class described, in combination, a beam, said beam comprising a plurality of longitudinally extending arms and a plurality of transversely extending arms, pivots in said beam, a frame, upwardly extending arms in said frame for supporting said pivots, clamping means mounted on said frame and adapted to engage one of said transversely extending arms on said beam, said clamping means comprising a plurality of vertically positioned spaced rods, a plate secured to the upper portion of said rods above the transverse arm to be clamped, a clamping member adapted for parallel vertical movement on said rods and positioned below the transverse arm to be clamped, a shaft, a cam mounted upon said shaft and adapted to actuate said parallelly moving member when said shaft is turned to force the transverse arm to be clamped into engagement with said plate.

14. In a device for establishing a static moment of an air screw propeller blade comprising a frame, upwardly extending arms upon said frame, a beam, pivots in said beam adapted to engage said arms extending upwardly from said frame, said beam comprising longitudinally extending spaced arms, a receiver secured to said beam adjacent but on one side of said pivots, said receiver being adapted to receive the shank of a propeller blade when such blade is held horizontal and lowered vertically, a cross arm adjustably secured to said longitudinally extending beam arms, stops adjustably secured in said adjustable cross arm for supporting such propeller at a point remote from its shank, adjustable means on the ends of the longitudinal cross arm on the opposite side of said pivot for supporting a weight calibrated shaft, a plurality of calibrated weights adapted to be mounted upon said shaft, a micrometer screw secured to one of said longitudinally extending arms and a threaded poise upon said screw for cooperation with said calibrated weights on said shaft for aiding in the determination of the static moment of such propeller and means for indicating the condition of balance of said beam, said means comprising an independently mounted, relatively movable pendulated indicator and chart.

HALVOR O. HEM.